Feb. 17, 1970  HAYATO TAKABAYASHI  3,496,466
INDUCTION TYPE INTEGRATING WATTMETER HAVING
PLURAL SEPARATED SHUNTS
Filed March 6, 1967  2 Sheets-Sheet 1

INVENTOR
HAYATO TAKABAYASHI

BY

ATTORNEY

Feb. 17, 1970

HAYATO TAKABAYASHI 3,496,466

INDUCTION TYPE INTEGRATING WATTMETER HAVING
PLURAL SEPARATED SHUNTS

Filed March 6, 1967

INVENTORS
HAYATO TAKABAYASHI

BY Paul M. Craig, Jr.

ATTORNEY

United States Patent Office 3,496,466
Patented Feb. 17, 1970

3,496,466
INDUCTION TYPE INTEGRATING WATTMETER HAVING PLURAL SEPARATED SHUNTS
Hayato Takabayashi, Hitachi-shi, Japan, assignor to Hitachi, Ltd., Tokyo, Japan, a corporation of Japan
Filed Mar. 6, 1967, Ser. No. 620,932
Claims priority, application Japan, Mar. 7, 1966, 41/13,580
Int. Cl. G01r 11/02
U.S. Cl. 324—137                          3 Claims

ABSTRACT OF THE DISCLOSURE

An induction type integrating wattmeter of improved load characteristics wherein a return plate for potential magnetic flux is provided on the potential electromagnet, and a side shunt across one common side of each leg of the U-shaped current electromagnet and an inner shunt between opposing ends of said two legs are provided.

---

This invention relates to an induction type meter, and, more particularly, to an induction type integrating wattmeter of improved load characteristics.

An induction type integrating wattmeter having a rotary disc, a potential electromagnet and a current electromagnet is so designed that the speed of the rotary disc is proportional to an applied power: $EI \cos \theta$, where E denotes an applied line voltage. I denotes a load current and $\cos \theta$ denotes a power factor, thereby watthours are measured by integrating the number of revolutions of the rotary disc.

However, the driving torque varies proportionally to the current flux $\Phi_I$ while the braking torque varies proportionally to the square of the current flux, i.e. $\Phi_I^2$, resulting in nonlinearity of the relation between the amount of the current and the number of revolutions. The load characteristics are indications of the variations in errors and are obtained by percentage value of the deviation in the number of rotations from the ideal when the load current is varied. This measurement is made at the rated voltage, using the power factor as a parameter.

Many attempts have been made to improve the load characteristics. Such an attempt is, for example, to reduce to provide ratio of the current magnetic flux $\Phi_I$ against the potential magnetic flux $\Phi_V$, i.e. $\Phi_I/\Phi_V$, as much as possible, to reduce the speed of the rotary disc, or to provide a saturable magnetic shunt on the current iron core. Among the above, the provision of a saturable magnetic shunt is most frequently used in practice. There are two ways for mounting a magnetic shunt on a current iron core; one way is that a magnetic shunt is mounted across one side of each leg of a current iron core, and another way is that a magnetic shunt is mounted with slots provided in the opposing faces of the legs of a current iron core.

For the convenience of explanation, the former way will be called a side shunt, and the latter an inner shunt, hereinunder. In the past, the substantial effects of both a side shunt and an inner shunt are considered to be equivalent, and either one was selected under consideration of convenience or readiness of manufacturing.

However, an integrating wattmeter of simple construction and superior load characteristics has not been obtained with the mere prior art.

It is required the a complicated construction as disclosed for example in U.S. Patent No. 2,162,522, "Watthour meter load compensation," to obtain superior load characteristics.

The principal object of the present invention is to provide an induction type integrating wattmeter which is reduced in size and weight and having remarkably improved load characteristics.

Another object of this invention is to provide an induction type integrating wattmeter of the above character, having a current electro-magnet provided with a magnetic shunt in which the construction of the magnetic shunt is simplified.

Still another object of this invention is to provide, in an integrating wattmeter of the characteristics described above, driving means reduced in both size and weight, which develops desired torque by providing a potential electro-magnet having a pole-piece with means for effectually developing potential magnetic flux.

Still another object of this invention is to provide an integrating wattmeter of the above characteristics, which is provided with driving means having a compensator of a simple construction easy to manufacture.

Other objects and advantages of this invention will be apparent from the following detailed explanation with reference to the accompanying drawings, in which.

Figure 1:
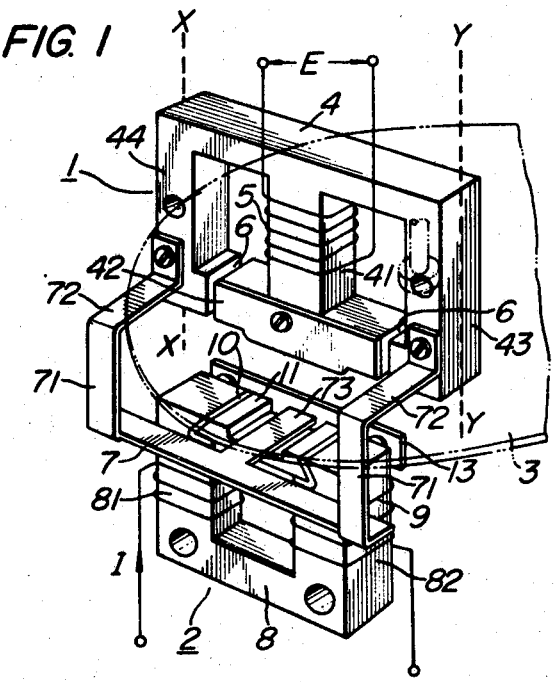
FIG. 1 is a schematic perspective view of driving means of an embodiment of this invention.

Referring to FIG. 1, reference numeral 1 denotes a potential electromagnet, 2 a current electromagnet and 3 an induction rotary disc disposed between the potential electromagnet 1 and the current electromagnet 2. The potential electromagnet 1 comprises a three-legged potential iron core 4, and a potential coil 5 wound around the central leg 41 of the core 4, a line voltage E being applied to the potential coil 5. A pole-piece 42 is mounted on the end of the central leg 41, forming a magnetic circuit together with the other legs 43 and 44 with air gaps 6, 6 intervening therebetween. The air gaps 6, 6 may be filled with suitable non-magnetic material. A T-shaped return plate for the potential magnetic flux, having rectangularly elongated arms 71 and 72, is mounted on one side of the potential iron core 4 at each end of the arms 72, 72. The return plate 7 is mounted in such a manner that the arms 71 and 72 wrap the rotary disc 3 and the tongue 73 is positioned just under the central leg 41 of the potential iron core 4. The return plate 7 is formed of, for example, a normal steel plate.

The current electromagnet is constructed with a U-shaped iron core 8 and a current coil 9 through which a load current I is supplied and which is wound around the legs 81 and 82 of the iron core 8. At each end of the opposed portions of the legs 81 and 82 a slot is provided respectively, and an inner shunt is mounted at the ends thereof in the slots between the two legs with spacers 10, 10 intervening therebetween. The inner shunt 11 preferably has a slot portion 12 and is made of silicon pure iron. The minimum sectional area of the inner shunt, which directly affects the shunt effect thereof, is determined at the slot portion 12. The spacer 10 is made of non-magnetic material, preferably such as aluminum plate, brass plate or vinyl-chloride plate.

A side shunt 13 is mounted on one side of the current electromagnet 2 is such a manner that the shunt lies across the end portions of both of the legs 81 and 82. The side shunt 13 is a magnetizable strip element made of, for example, silicon pure iron, and is mounted across the legs 81 and 82 by non-magnetic screws 15, 15 with respective non-magnetic spacers 14, 14 intervening therebetween.

In the past, since the effects of a side shunt and an inner shunt were considered to be equivalent, only either one of the side and inner shunts was used. The present inventor confirmed by experiments that both the shunts affect in multiplication with each other, and that the load characteristics are remarkably improved by using both of the shunts.

It seems that the return plate 7 for the potential magnetic flux also contributes to the improvement of the load characteristics.

Figure 3:
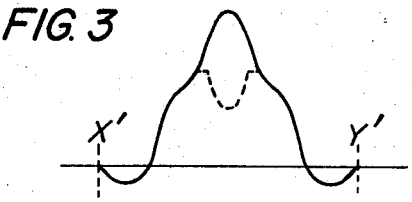
FIG. 3 shows the potential magnetic flux distribution intersecting the rotary disc when a return plate for the potental magnetic flux is provided.

Consideration of respective distribution of the potential magnetic flux and the current magnetic flux both intersecting the rotary disc will contribute to understanding of the features and effects of the return plate 7 and both of the shunts 11 and 13. As the return plate 7 is so constructed that the tongue 73 thereof is positioned just under the central leg, the distribution of the potential magnetic flux intersecting the rotary disc is such as shown in FIG. 3, of which the central portion is made remarkably higher than the remaining portions. The dotted line shows the distribution of the potential magnetic flux when the return plate 7 is not provided. X' and Y' in FIG. 3 substantially correspond spatially to the outer sides X and Y of the potential iron core, respectively in FIG. 1. The potential magnetic flux is generated at a higher efficiency by the provision of the return plate, and thus, the inventor succeeded in obtaining a sufficient driving torque with an iron core which is reduced in size as well as in weight.

Further, it is confirmed, by observing the variation in the distribution of magnetic flux, that the combination of an inner shunt and a side shunt has an effect which could not be obtained by the individual use of any shunt.

Figure 2:
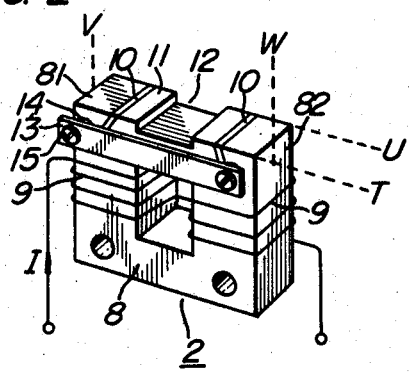
FIG. 2 shows only the current electro-magnet portion of the embodiment shown in FIG. 1.
Figures 4A, 4B:
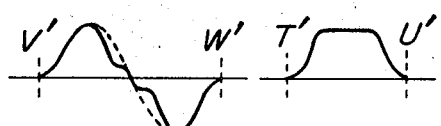
FIGS. 4a and 4b show the potential magnetic flux distributions intersecting the rotary disc when only an inner shunt is provided.

FIG. 4a and FIG. 4b show the distributions of current magnetic flux intersecting the corresponding portions of a rotary disc to a current iron core, when only an inner shunt is provided. The dotted line shows the distribution when no shunt is provided. FIG. 4a shows the distribution in a longitudinal direction with the corresponding portion of the rotary disc being rectangular wherein V' and W' substantially correspond spatially to V and W in FIG. 2 respectively.

Figures 5A, 5B:
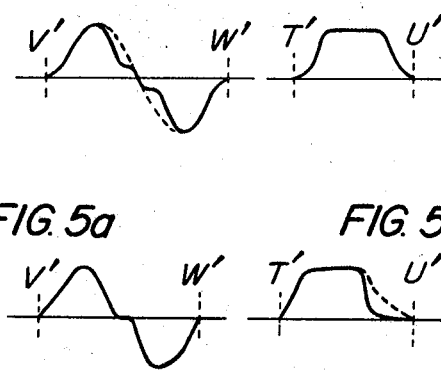
FIGS. 5a and 5b show the potential magnetic flux distributions intersecting the rotary disc when only a side shunt is provided.
Figures 6A, 6B:
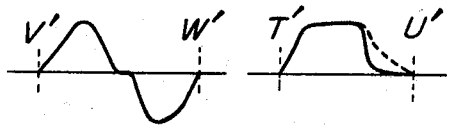
FIGS. 6a and 6b show the magnetic flux distributions when both the inner shunt and side shunt are provided.

As is apparent from FIG. 4a and FIG. 4b, the shunt effect appears only in the longitudinal distribution, and there is no shunt effect in the direction transverse thereto. FIG. 5a and FIG. 5b show the distributions of current magnetic flux when only a side shunt is provided. As is apparent from FIG. 5a and FIG. 5b, the shunt effect appears only in a direction transverse to a longitudinal direction. FIG. 6a and FIG. 6b show the distributions of the magnetic flux when both an inner shunt and a side shunt are used in combination wherein the shunt effect appears in both the longitudinal direction and the direction transverse thereto. This is considered to be one of the grounds for the achievement of unexpected remarkable improvement in the load characteristics according to this invention.

The tongue 73 of the return plate 7 is, most preferably for manufacturing, positioned within the slot 12 of the inner shunt 11, as shown in FIG. 1.

Figure 7:
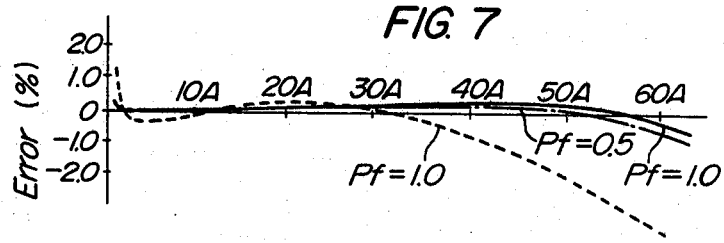
FIG. 7 is the load characteristic curves of the integrating wattmeter according to this invention.

FIG. 7 shows the load characteristic curves of the device according to this invention, wherein the solid line and the broken line indicate the curves for power factors 1.0 and 0.5, respectively, and the dotted line shows the characteristic of the conventional device for power factor 1.0 using only an inner shunt.

Further, as the device of this invention is so made that it effectively generates driving torque, the weight is reduced to about half and the size is reduced to about two thirds of the conventional standard device of comparable characteristics.

As described above, according to this invention, an integrating wattmeter of reduced size and weight, and of remarkably improved characteristic, is obtained by the provision of a potential return plate with a potential iron core, and an inner shunt and a side shunt with a current iron core. This considered due to the mutual interaction of both the return plate and the combination of the inner and side shunts.

Although an embodiment of this invention has been explained, it is intended that all matter contained in the above description or shown in the accompanying drawings shall be interpreted as illustrative and not in a limiting sense.

What is claimed is:
1. An induction-type integrating wattmeter comprising
   a rotary disc,
   a potential electromagnet including a three-legged iron core, potential windings wound around the central leg of said three-legged core, and a return plate for potential magnetic flux having a first portion mounted across the outer two legs of said three-legged magnet and an end portion extending from said first portion and being disposed in a fixed position across the rotary disc substantially on the axis of said central leg,
   a current electromagnet having a U-shaped iron core,
   first magnetizable shunt means provided between one respective side of each of the legs of said U-shaped iron core, and
   second magnetizable shunt means physically separated from said first shunt means and provided between the facing end portions of both of the legs of said U-shaped iron core, including a magnetizable element and spacing means of non-magnetic material, both of the legs of said U-shaped iron core having slots on respective facing portions thereof and said magnetizable element being mounted across said legs of said U-shaped iron core with respective ends thereof positioned in respective slots and said spacing means respectively intervening therebetween,
   said second magnetizable shunt means being provided with a slot within which the end portion of said return plate is disposed in non-contacting relationship.
2. An induction-type integrating wattmeter comprising
   a rotary disc,
   a current electromagnet having a U-shaped iron core,
   a potential electromagnet having a three-legged iron core with a pole piece provided on the end portion of the central leg thereof to form a magnetic circuit together with the outer two legs with air gaps intervening therebetween, a potential winding wound around said central leg, and a return plate for potential magnetic flux having a first portion mounted across said outer two legs and having an end portion extending from said first portion and positioned substantially oppositely to said central leg with said rotary disc interposed therebetween,
   first magnetizable shunt means mounted across one respective side of the end portions of the two legs of said U-shaped iron core, and
   second magnetizable shunt means physically separated from said first shunt means provided between the opposing end portions of said two legs.
3. An induction type integrating wattmeter according to claim 2, wherein said second magnetizable shunt means includes spacing means and a magnetizable element, said element being mounted between the opposing two legs with said spacing means intervening therebetween, and said element having a slot portion adapted to accept the end portion of said return plate for potential magnetic flux.

References Cited

UNITED STATES PATENTS

| 1,745,842 | 2/1930 | Callsen | 324—137 |
|---|---|---|---|
| 2,022,392 | 11/1935 | Spahn | 324—138 X |
| 2,208,415 | 7/1940 | Franck et al. | 324—137 X |
| 2,813,252 | 11/1957 | Leippe | 324—137 |

FOREIGN PATENTS 867,571  2/1953  Germany.

ALFRED E. SMITH, Primary Examiner